United States Patent [19]
Makowan

[11] Patent Number: 5,613,513
[45] Date of Patent: Mar. 25, 1997

[54] LIQUID FLOW CONTROL DEVICE

[75] Inventor: Ted J. Makowan, Schaumburg, Ill.

[73] Assignee: Val-Matic Valve & Mfg. Corporation, Elmhurst, Ill.

[21] Appl. No.: 425,591

[22] Filed: Apr. 20, 1995

[51] Int. Cl.$^6$ .............................. F16K 24/04; F16K 31/18
[52] U.S. Cl. ............................. 137/1; 137/202; 137/388
[58] Field of Search .................................. 114/212; 137/1, 137/202, 388

[56] References Cited

U.S. PATENT DOCUMENTS

| | | | |
|---|---|---|---|
| 462,604 | 11/1891 | Utley | 114/212 X |
| 713,834 | 11/1902 | Bailey | 137/388 X |
| 785,594 | 3/1905 | Crispin | 137/202 |
| 2,388,481 | 11/1945 | Green | 137/202 |
| 2,603,493 | 7/1952 | Rusconi | 137/202 |
| 2,666,445 | 1/1954 | Cronkhite . | |
| 2,725,071 | 11/1955 | McKillop | 137/202 |
| 3,599,659 | 8/1971 | Nuter et al. | 137/202 |
| 3,620,240 | 11/1971 | Bogdanski . | |
| 3,786,829 | 1/1974 | Nardo et al. | 137/202 |
| 3,910,302 | 10/1975 | Sudhir . | |
| 3,958,591 | 5/1976 | Hansel et al. . | |
| 4,029,487 | 6/1977 | Brandt . | |
| 4,094,346 | 6/1978 | Milo . | |
| 4,166,791 | 9/1979 | Marvin . | |
| 4,586,528 | 5/1986 | Andres et al. | 137/202 |
| 4,981,154 | 1/1991 | Bailey et al. . | |
| 5,033,646 | 7/1991 | McCann et al. . | |
| 5,213,586 | 5/1993 | Welker . | |
| 5,386,843 | 2/1995 | Church | 137/202 |

*Primary Examiner*—Gerald A. Michalsky
*Attorney, Agent, or Firm*—Hill, Steadman & Simpson

[57] ABSTRACT

A system and a method are provided for controlling flow of air and preventing flow of liquid within vent lines connected to, for example, a pipe line or other like piping systems. A housing is provided with a float and a seat within the housing having an opening therethrough wherein the float is capable of sealing the opening of the seat during a flooding condition. The first housing with the float is connected to one end of a vent line. A second housing is connected to another end of the vent line having a float therein for sealing an outlet formed by a seat with an opening therethrough. Optionally, a screen may be provided to prevent articles from entering the housing upon a flooding condition exposing the housing to both liquid and extraneous particles.

24 Claims, 4 Drawing Sheets

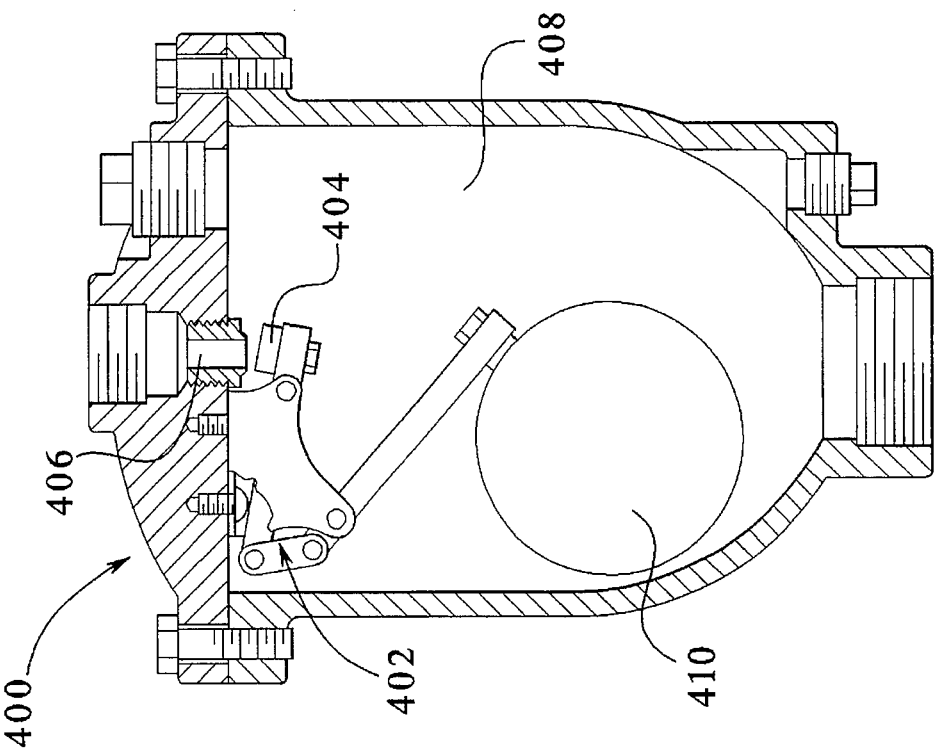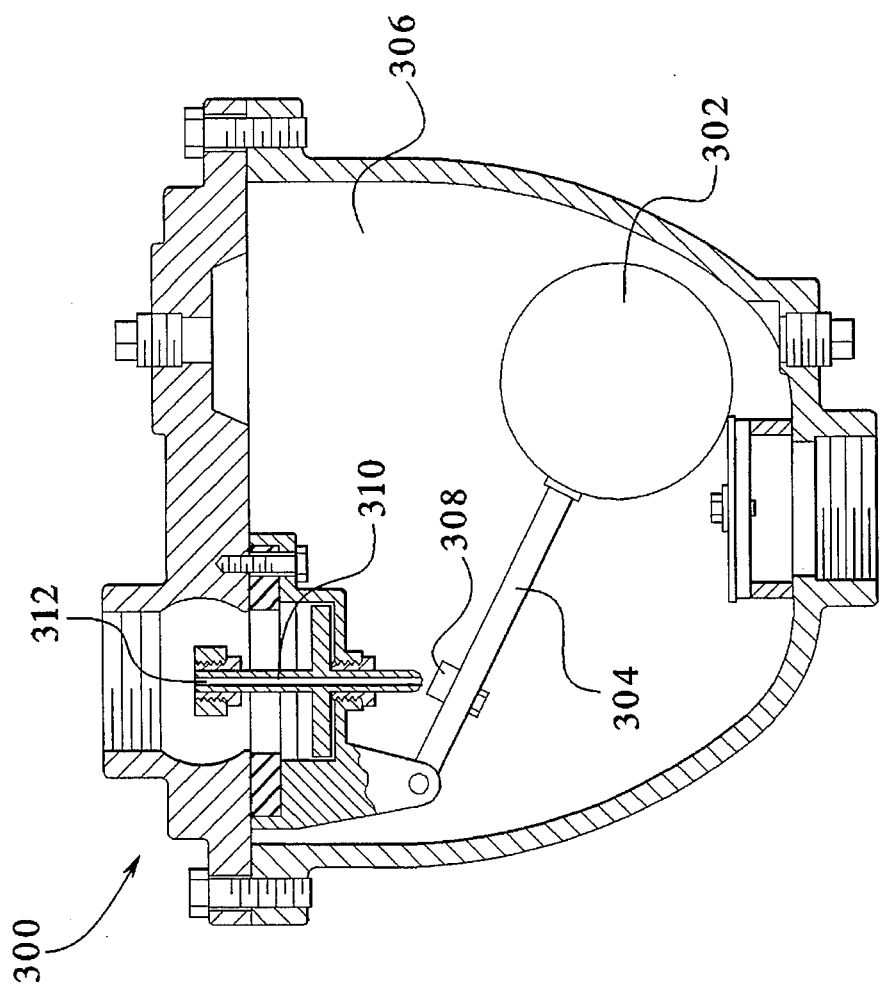

LIQUID FLOW CONTROL DEVICE

BACKGROUND OF THE INVENTION

The present invention generally relates to venting, exhaustion and/or admission of air in piping systems. More specifically, the present invention relates to a system and a method for controlling the entrance of water into a pipeline and its associated venting system when an area surrounding the same is flooded.

It is, of course, generally known to provide check valves. For example, a floatable check valve is disclosed in U.S. Pat. No. 3,620,240 to Bogdanski. Bogdanski discloses a double check valve vent in which floatable valves are positioned in a vent line to be floated up against a valve set when fluid flows outwardly from the tank or flows inwardly toward the tank. The floatable valves, in the absence of fluid, are each spaced a substantial distance from their respective seats so that fumes venting from the tank may move freely with a complete absence of back pressure. The vent pipe of Bogdanski is particularly applicable for use with fuel tanks on boats wherein it is important to prevent the flow of water through the vent line into the fuel tank to prevent the flow of gasoline or fuel oil out of the vent line and onto the boat where it potentially may present a fire hazard.

However, the arrangement illustrated by Bogdanski has its drawbacks. First, the arrangement is designed for routine venting of a tank and does not provide the flow capacity or characteristics needed for protecting piping systems from over and under pressurization. The valve also lacks sealing features to positively prevent the entrance of outside fluid. Therefore, the check valve has limited adaptability for various applications.

A need, therefore exists for an improved air valve with a liquid flow device capable of protecting piping systems for adverse pressure conditions and the entrance of external fluids. Further, because of the critical application of the valve, a provision for field testing is needed.

SUMMARY OF THE INVENTION

The present invention provides a system and a method including an air/vacuum valve, air release valve or combination-type air valve having a liquid flow control device. In addition, the present invention provides a system and a method easily adaptable to any system requiring a liquid flow control device used in conjunction with a length of piping.

To this end, in an embodiment of the present invention, a system is provided for controlling flow of liquid within a vent line. The system has a first float and a first body defining an interior having the first float therein, wherein the first body has an inlet and an outlet. A first baffle supports the first float within the interior of the body. A first seat is at the outlet of the body, wherein the first float is capable of moving between the first baffle and the first seat due to entry of the liquid through the inlet of the first body. A second float is provided within a second body defining an interior, wherein the second body has a second seat at the outlet of the second body, and wherein the second float is capable of sealing an opening through the second seat due to entry of liquid through the inlet of the second body. A length of piping connects the first body to the second body.

In an embodiment, a second baffle supports the second float within the interior of the second body.

In an embodiment, a first cover encloses the first body, wherein the outlet is incorporated in the first cover in fluid communication with an opening through the first seat.

In an embodiment, the length of piping is U-shaped having a first end and a second end, wherein the outlet of the first body is connected to the first end and the outlet of the second body is connected to the second end.

In an embodiment, a third body defines an interior connected to the inlet of the second body.

In an embodiment, a third float is within the interior of the third body.

In an embodiment, a seat is provided at an outlet of the third body having an opening through the seat, wherein the first float is capable of sealing the opening through the seat.

In an embodiment, a screen is provided at the inlet of the second body.

In an embodiment, a third float is operatively connected to the second float.

In an embodiment, a third baffle supports the third float within the interior of the third body.

In an embodiment, a plunger is operatively connected to the first float and is constructed and arranged to extend into the first baffle supporting the first float.

In another embodiment of the present invention, a method is provided for preventing flow of liquid through a vent line. The method comprises the steps of: providing a length of piping defining at least a portion of the vent line wherein the length of piping has a first end and a second end; connecting an outlet end of the first housing to a length of piping; connecting an outlet end of a second housing to the second end of the length of piping; providing a first float supported on a baffle within a first housing to seal the outlet end of the first housing in the event of liquid flooding the first housing; and providing a second float within the second housing to seal the outlet end of the second housing in the event of liquid flooding the second housing.

In an embodiment, the method further comprises the step of providing a third float operatively connected to the second float.

In another embodiment, the method further comprises the step of connecting a third housing to an inlet end of the second housing. A third float may be provided within the third housing to seal an outlet end of the third housing.

In an embodiment, the method further comprises the step of screening particles from entering the second housing.

In an embodiment, the method further comprises the step of providing a seat having an opening therethrough at the outlet end of the first housing wherein the first float seals the opening of the seat in the event of liquid flooding the housing.

In an embodiment, the length of piping used in the method is U-shaped intermediate the first end and the second end.

In an embodiment, the method further comprises the step of providing a plunger operatively connected to the first float and extending through the baffle.

In an embodiment, the first float and the second float are substantially equally horizontally disposed with respect to each other.

It is, therefore, an advantage of the present invention to provide a system and a method for controlling flow of liquid within a vent line for gases or air through a pipeline or other like piping system.

Another advantage of the present invention is to provide a system and a method for controlling flow of liquids within a vent line that automatically seals an end of the vent line when subjected to flooding.

Yet another advantage of the present invention is to provide a system and a method for controlling flow of liquid within a vent line in at least two directions.

Additional features and advantages of the present invention are described in, and will be apparent from, the detailed description of the presently preferred embodiments and from the drawings.

BRIEF DESCRIPTION OF THE DRAWINGS

FIG. 4 illustrates a cross-sectional view of an alternate embodiment of a liquid flow control device of the present invention.

FIG. 5 illustrates a cross-sectional view of yet another embodiment of a liquid flow control device of the present invention.

DETAILED DESCRIPTION OF THE PRESENTLY PREFERRED EMBODIMENTS

The present invention generally relates to a system and a method for exhausting and emitting air when installed on water and waste handling pipelines and/or piping systems. A primary function of such air/vacuum valves, air release valves and combination-type air valves is to prevent air and/or vacuum related problems within a liquid pipeline. The system includes a liquid flow device to control entrance of water into the pipeline when the area surrounding the system is flooded.

Figure 1:
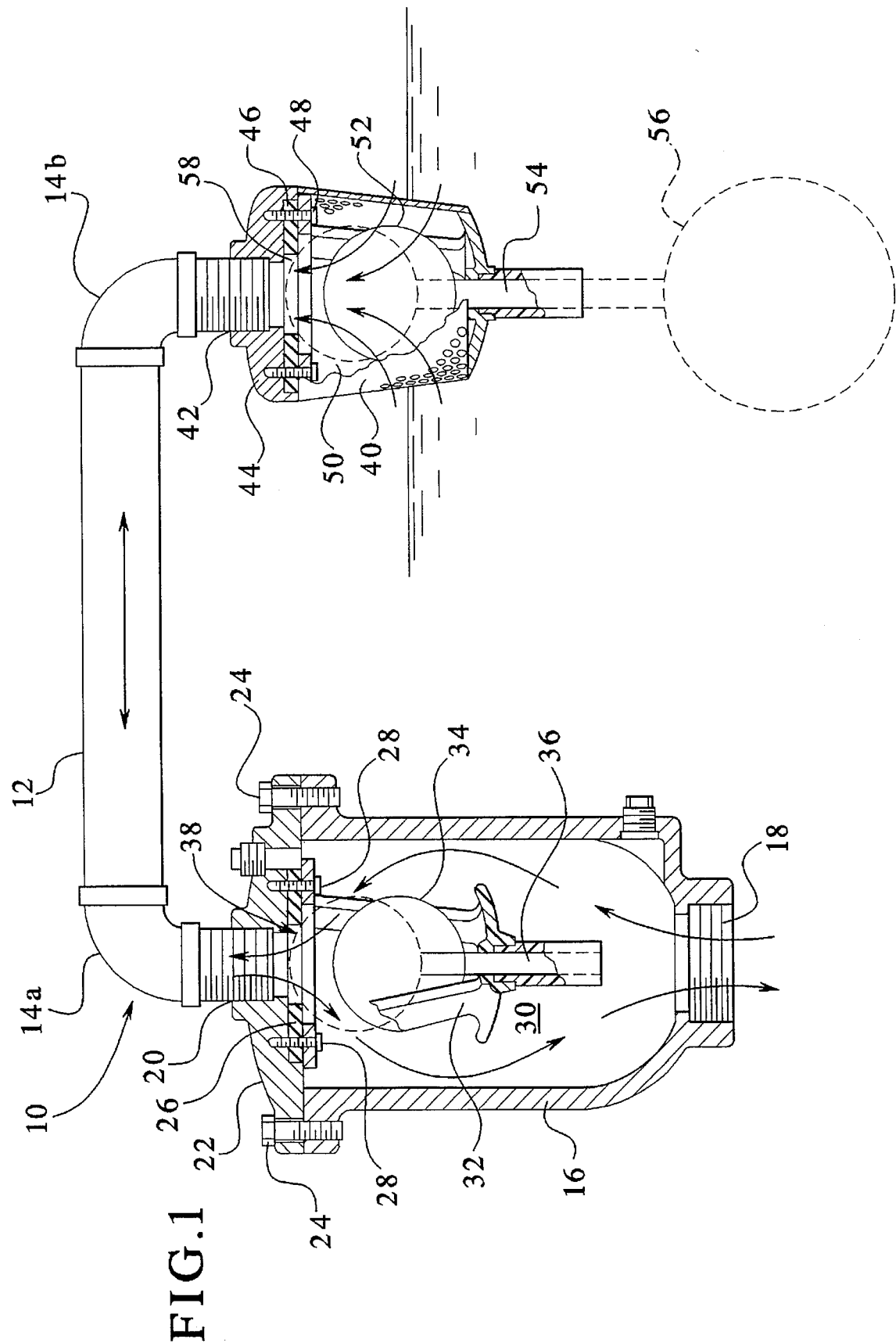
FIG. 1 illustrates an elevation view, partially in cross-sectional detail, of an embodiment of the system of the present invention including a liquid flow control device.

Referring now to FIG. 1, a first embodiment of a system 10 of the present invention is illustrated. The system 10 includes a length of piping 12 connected between bends 14a and 14b. Collectively, the piping 12 and the bends 14 create a passageway for flow of, preferably, a gas. At or near an end of one of the bends 14a or 14b is a body 16 having an inlet 18 for connection to a pipeline and an outlet 20 for connection to the first bend 14a. A threaded inlet connection is shown, but other connections may be used, such as flanged or grooved ends for couplings. The body 16 includes a cover 22 removably securable to the body 16 with screws 24 or other like fastening means.

Mounted on the cover 22 to face an interior of the body 16 is a seat 26. The seat 26 is secured on the cover 22 by the screws 28 or other like fastening means. The body 16 defines an interior 30 including a baffle 32 within the interior supporting a float 34 when in the position illustrated in FIG. 1. A plunger 36 is provided to stabilize the position of the float 34 and to assure that it will move to the position illustrated in phantom within the interior 30 of the body 16. The plunger 36 guides the float in an essentially linear vertical path toward and away from the seat 26, thus preventing the float from becoming dislodged or diverted laterally which might otherwise prevent a liquid tight seal of the float against the seat. The float 34 in the phantom position is forced into the seat 26 to seal an opening 38 leading into the bend 14a and subsequently the piping 12. The plunger 36 and the float 34 are responsive to liquid, such as water, raising the float 34 such that the float 34 seals the opening 38 of the seat 26.

Similarly, a second body 40 is provided connected at its outlet 42 to the bend 14b. The second body 40 may have a screen on its exterior as illustrated. A cover 44 may be integrally formed with the screen with a seat 46 secured to the cover 44 with screws 48 or other like fasteners. Within an interior 50 of the body 40 is a float 52 on a plunger 54. The plunger may optionally be connected to a second float 56 as illustrated in FIG. 1. The float 52, as illustrated, is in its open position. However, rising water will lift the float 56 which, in turn, forces the float 52 into the seat 46 thereby providing tight shut-off before the water level reached seat opening 58.

Operation of the liquid pipeline or piping system is as follows. Air is forced ahead of flowing liquid and the air compresses and flows around the float 34 as shown in its open position. The air continues to flow through the bend 14a, the piping 12 and the bend 14b around the float 52 in its open position as illustrated in FIG. 1. The air is then allowed to pass into the atmosphere. When liquid reaches the body 16 of the air/vacuum valve, the liquid enters through the inlet 18. As the interior 30 of the body 16 fills, the float 34 moves from its open to its closed position as shown in phantom preventing the liquid within the liquid pipeline or the like, connected to the inlet 18 of the body 16, from escaping.

When the pipeline or other like system is drained or goes into a negative pressure condition, the float 34 drops from its closed position to the open position allowing air to flow around the float 52 within the body of the liquid flow control device and through the bends 14a and 14b as well as the length of piping connected therebetween. Then, the air passes around the float 34 while in its open position through the interior 30 of the body 16 and out of the inlet 18 and into the pipeline or like assembly.

If the area around the body 40 of the liquid flow control device were to flood with fluid, the float 52 raises to a closed position as illustrated in phantom in FIG. 1. The closed position of the float 52 stops any flood water from entering through the remainder of the system 10 and ultimately into the pipeline connected at the inlet 18 of the body 16.

Figure 2:
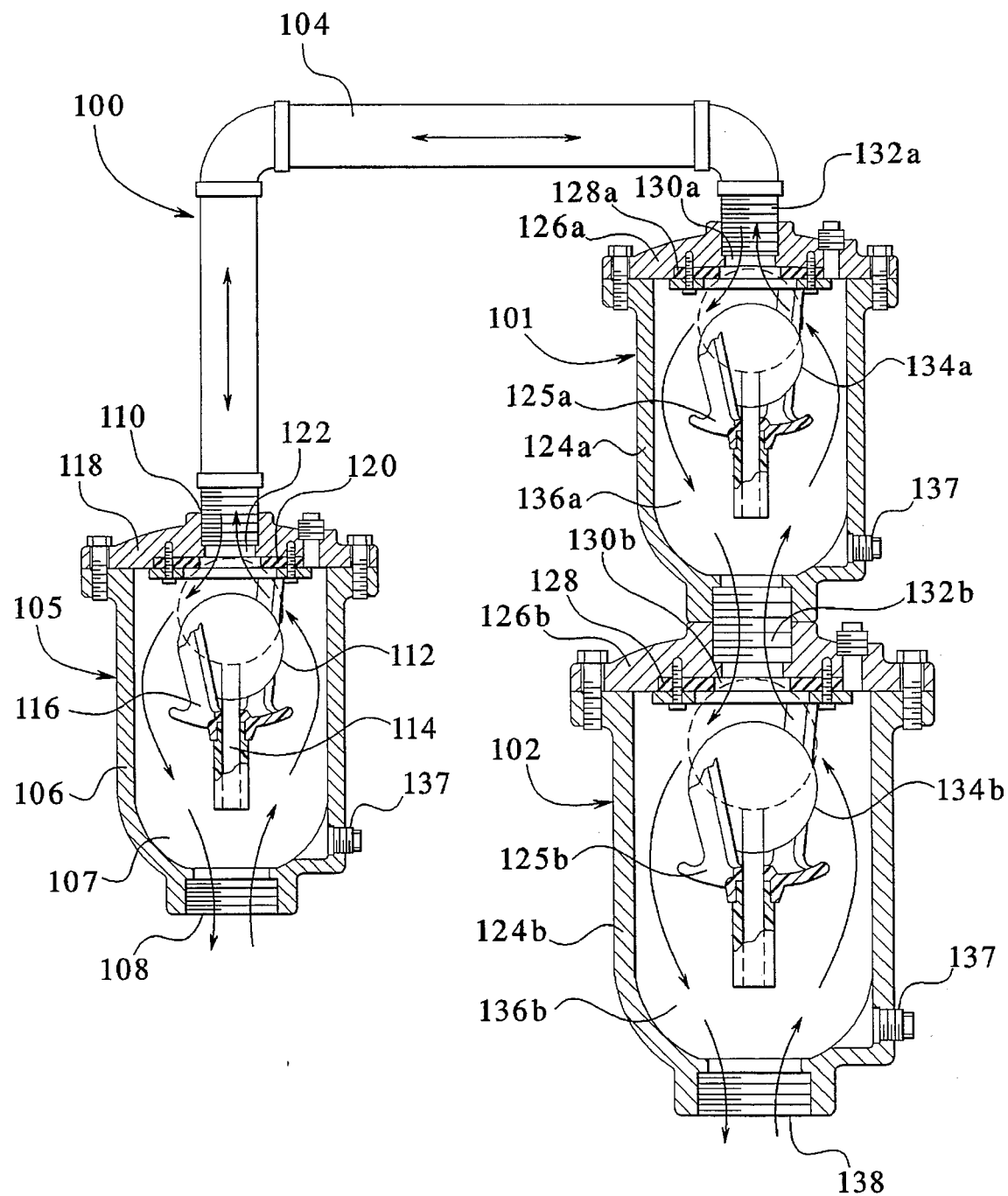
FIG. 2 illustrates an elevation view, partially in cross-sectional detail, of an alternate embodiment of the system of the present invention including a multiple check on a reverse flow side of the valving system of the present invention.

Referring now to FIG. 2, an alternate embodiment of a system 100 is illustrated. The system 100 is essentially the same as the system illustrated in FIG. 1 with the primary difference being the addition of a second liquid flow control device 102 connected in series with a first liquid flow control device 101. The system 100 includes a length of U-shaped piping 104 that may be a continuous, integral piece or similarly connected with bends as illustrated with respect to FIG. 1. An air vacuum valve 105 is connected at an opposite end of the U-piping 104 from the liquid float control devices 101 and 102.

The air-vacuum valve 105 includes a body 106 having an inlet 108 and an outlet 110. The inlet 108 is connected to, for example, a fluid pipeline (not shown). The outlet 110 is connected to the U-piping 104. Within the body 106 of the air-vacuum valve 105 is a float 112 having a plunger 114 extending within a baffle 116. The body 106 is enclosed by a cover 118 including a seat 120 incorporated into or connected to the cover 118 having an opening 122 therethrough in fluid communication with the outlet 110 of the body 106.

The liquid float devices 101 and 102 are substantially identically constructed, and each has a body 124a, 124b with a cover 126a, 126b operatively connected and secured within the body 124a, 124b. The embodiment of FIG. 2 is equipped with test ports 137. With the exit port 138 temporarily plugged, a test fluid, such as water, is pumped into the body cavities 136a, 136b until the floats 134 provide tight shut-off against the seats 128. Incorporated into the cover 126a, 126b is a seat 128a, 128b having an opening 130a, 130b therethrough in fluid communication with an outlet 132a, 132b of the liquid float control devices 101 and 102. A float 134a, 134b is provided within an interior 136a, 136b of the body 124a, 124b. The float 134a, 134b is illustrated in its open position within the interior 136a, 136b of the body 124a, 124b.

The condition illustrated in FIG. 2 is when air is being filled within a liquid pipeline, and air is forced ahead of the flowing liquid. As the air compresses, the air flows around the air valve 105 and its float 112 through the U-piping 104 and through both LFC devices 101 and 102 and then through an outlet 138 of the second liquid float control device 102. In this condition, all of the floats 112 and 134a, 134b are in the position illustrated in FIG. 2. If, however, liquid begins to flow into an interior 107 of the body 106 of the air/vacuum valve 105, the float 112 is urged upward to close the opening 122 through the seat 120 thereby preventing any fluid flowing into the U-piping 104.

Likewise, if the fluid level begins to rise or flood through the outlet 138 of the liquid flow control devices 101, 102, the float 134b of the second liquid flow control device 102 will first raise to seal the opening 130b through the seat 128b. Residual or excessive flooding or a leak in the seat 128b of the second liquid flow device allows fluid to pass through the liquid float control device 102 into the interior 136a of the first liquid flow control device, the float 134a of the first liquid flow device 101 is forced to seal the opening 130a through the seat 138.

The interior 136a, 136b of the liquid flow devices 101 and 102 have identical volume or, in a preferred embodiment, the volume of the interior 136b of the second liquid flow device 102 may be larger than the volume of the interior 136a of the first liquid flow control device 101 as illustrated in FIG. 2. A screen (not shown) may be provided at the outlet 138 of the liquid flow control device 102 to prevent certain particles or the like from entering into the interior 136 of the liquid flow control device 102 thereby preventing clogging or drainage and/or fluid flow problems within the system 100.

Although a preferred embodiment of the present invention has been described with reference to FIGS. 1 and 2, it should be understood that different shapes of the float rather than the spherical float illustrated may be implemented by those skilled in the art. Also, the material of the float and screen modifications, such as location of screen, type of screen and the like, may be made by a skilled practitioner. What is important is that the density of the float must be less than the density of the activating fluid, yet must be greater than the density of the fluid which is to be allowed to pass the float unrestricted.

Figure 3:
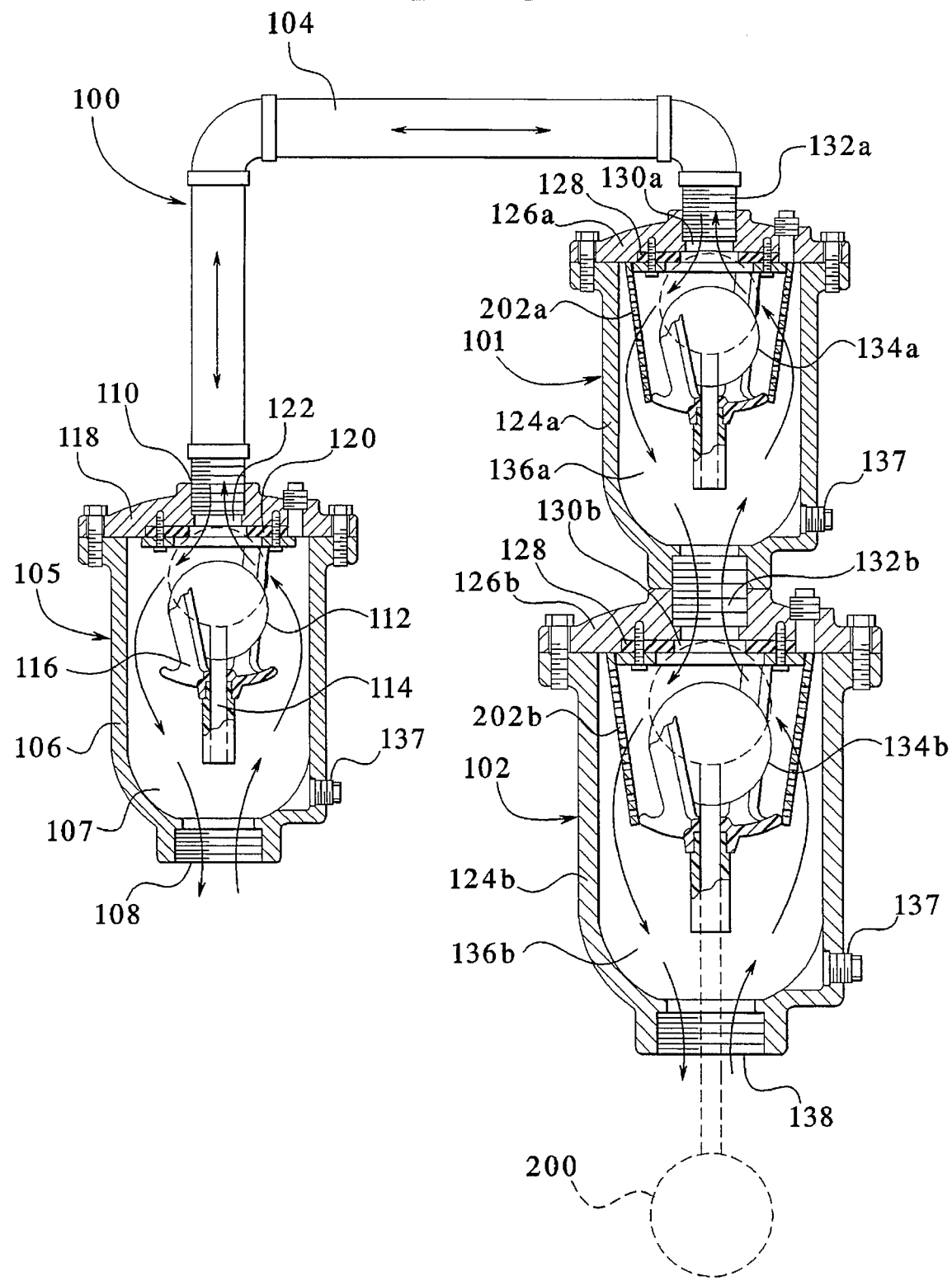
FIG. 3 illustrates an elevation view, partially in cross-sectional detail, of an embodiment of the system of the present invention including a liquid flow control device.

Referring now to FIG. 3, an identical system as that illustrated in FIG. 2 is shown as like numerals refer to like parts. In addition, an optional float 200 may be provided as well as optional screens 202a, 202b within the bodies 124a, 124b of the liquid float devices 101, 102, respectively. In an embodiment, the screens 202a, 202b may be secured around the floats 134a, 134b, respectively, and may be fixedly secured between the covers 126a, 126b and the baffles 125a, 125b in a conventional manner so as not to interfere with operation of the floats 134a, 134b in the interiors 136a, 136b of the float devices 101, 102.

Referring now to FIGS. 4 and 5, alternate embodiments of liquid float devices 300 and 400 are shown. As illustrated in FIG. 4, a float 302 is attached to a shaft 304. When air from an interior 306 of the float device 300 requires release due to increased liquid entering the interior 30b, the float 302 is raised in the interior 306 such that a flange 308 on the shaft 304 comes into contact with a valve stem 310 causing the stem 310 to raise and allow accumulated air to be released. Therefore, larger quantities of air present during filling may be exhausted, and air is allowed to enter through a vent line 312 in the valve stem 310 during draining.

Likewise, in the float device 400 illustrated in FIG. 5, a lever mechanism generally designated at 402 forces a flange 404 against a valve sent 406 to effect release of air in an interior 408 of the float device 400. Actuation of the lever mechanism 402 results from increased liquid level entering the interior 408 of the float device 400 raising a float 410 therein. As a result, pockets of air may be released as the same accumulates in the float device 400.

Although the primary use of the present invention is within water and waste water piping/pipeline systems, the present invention may be implemented within a variety of applications in which liquid flow control may be required.

It should be understood that various changes and modifications to the presently preferred embodiments described herein will be apparent to those skilled in the art. Such changes and modifications may be made without departing from the spirit and scope of the present invention and without diminishing its attendant advantages. It is, therefore, intended that such changes and modifications be covered by the appended claims.

I claim:

1. A system for controlling flow of liquid within a vent line, the system comprising:

a first body defining an interior having a first float therein wherein the first body has an inlet and an outlet;

a first baffle supporting the first float within the interior of the body, the first baffle having a channel and a plurality of support arms connected to the body;

a first seat at the outlet of the first body wherein the first float is capable of moving between the first baffle and the first seat due to entry of the liquid through the inlet of the first body;

a plunger operatively connected to the first float and constructed and arranged to extend into the channel of the first baffle so that the plunger and the first float move as a unit;

a second float;

a second body defining an interior having the second float therein wherein the second body has an inlet and an outlet;

a second seat at the outlet of the second body wherein the second float is capable of sealing an opening through the second seat due to entry of liquid through the inlet of the second body; and a length of piping connecting the first body to the second body.

2. The system of claim 1 further comprising:

a second baffle supporting the second float within the interior of the second body.

3. The system of claim 1 further comprising:

a first cover enclosing the first body wherein the outlet is incorporated in the first cover and in fluid communication with an opening in the first seat.

4. The system of claim 1 wherein the length of piping is U-shaped having a first end and a second end wherein the outlet of the first body is connected to the first end and the outlet of the second body is connected to the second end.

5. The system of claim 1 further comprising:

a third body defining an interior connected to the inlet of the second body.

6. The system of claim 5 further comprising:

a third float within the interior of the third body.

7. The system of claim 6 further comprising:

a seat at an outlet of the third body having an opening through the seat wherein the third float is capable of sealing the opening of the seat.

8. The system of claim 6 further comprising:

a second baffle supporting the third float within the interior of the third body.

9. The system of claim 6 further comprising:

an auxiliary float operatively connected to the third float.

10. The system of claim 1 further comprising:

a screen at the inlet of the second body.

11. The system of claim 1 further comprising:

a third float operatively connected to the second float.

12. The system of claim 11 further comprising:

a screen surrounding the third float.

13. The system of claim 1 further comprising:

a screen surrounding the second float.

14. A method for preventing flow of a liquid through a vent line, the method comprising the steps of:

providing a length of piping defining at least a portion of the vent line wherein the length of piping has a first end and a second end;

connecting an outlet end of a first housing to the first end of the length of piping;

connecting an outlet end of a second housing to the second end of the length of piping;

providing a first float supported on a baffle within the first housing to seal the outlet end of the first housing in the event of liquid flooding the first housing the baffle having a channel and support arms connected to the first housing;

providing a plunger operatively connected to the first float and extending through the channel of the baffle so that the plunger and the first float move as a unit; and providing a second float within the second housing to seal the outlet end of the second housing in the event of liquid flooding the second housing.

15. The method of claim 14 further comprising the step of:

providing a third float operatively connected to the second float.

16. The method of claim 14 further comprising the step of:

connecting a third housing to an inlet end of the second housing.

17. The method of claim 16 further comprising the step of:

providing a third float within the third housing to seal an outlet end of the third housing.

18. The method of claim 16 further comprising the step of:

providing test connections.

19. The method of claim 14 further comprising the step of:

screening particles from entering the second housing.

20. The method of claim 14 further comprising the step of:

providing a seat having an opening therethrough at the outlet end of the first housing wherein the first float seals the opening of the seat in the event of liquid flooding the first housing.

21. The method of claim 14 wherein the length of piping is U-shaped intermediate the first end and the second end.

22. The method of claim 14 wherein the first float and the second float are substantially equally horizontally disposed with respect to each other.

23. A system for controlling flow of liquid within a vent line, the system comprising:

a first body defining an interior having a first float therein, wherein the first body has an inlet and an outlet;

a first baffle supporting the first float within the interior of the body, the first baffle having a plurality of support arms connected at a first end to the first body and connected at a second end to form a channel at the second end;

a first seat at the outlet of the first body wherein the first float is capable of moving between the first baffle and the first seat due to entry of the liquid through the inlet of the first body;

a plunger operatively connected to the first float and constructed and arranged to extend into the channel formed in the first baffle supporting the first float;

a second float;

a second body defining an interior having the second float therein wherein the second body has an inlet and an outlet;

a second seat at the outlet of the second body wherein the second float is capable of sealing an opening through the second seat due to entry of liquid through the inlet of the second body; and a length of piping connecting the first body to the second body.

24. A method for preventing flow of a liquid through a vent line, the method comprising the steps of:

providing a length of piping defining at least a portion of the vent line wherein the length of piping has a first end and a second end;

connecting an outlet end of a first housing to the first end of the length of piping;

connecting an outlet end of a second housing to the second end of the length of piping;

providing a first float supported on a baffle within the first housing to seal the outlet end of the first housing in the event of liquid flooding the first housing, the baffle having a plurality of support arms connected at a first end to the first housing and at a second end to form a channel;

providing a plunger operatively connected to the first float and extending through the channel of the baffle; and providing a second float within the second housing to seal the outlet end of the second housing in the event of liquid flooding the second housing.

* * * * *

UNITED STATES PATENT AND TRADEMARK OFFICE
CERTIFICATE OF CORRECTION

PATENT NO. : 5,613,513
DATED : March 25 ,1997
INVENTOR(S) : Ted J. Makowan

It is certified that error appears in the above-indentified patent and that said Letters Patent is hereby corrected as shown below:

Column 5, line 5 should read "138", not 136a, 136b;

Column 5, line 7 should read "136a, 136b", not 138.

Signed and Sealed this

Twenty-fifth Day of August, 1998

Attest:

BRUCE LEHMAN

*Attesting Officer*       *Commissioner of Patents and Trademarks*